May 21, 1968     H. L. WOODLIEF, JR     3,384,329

FLEXIBLE WING VEHICLE

Filed July 1, 1966     2 Sheets-Sheet 1

INVENTOR.
HORACE L. WOODLIEF

BY Richard D. Seibel

ATTORNEY

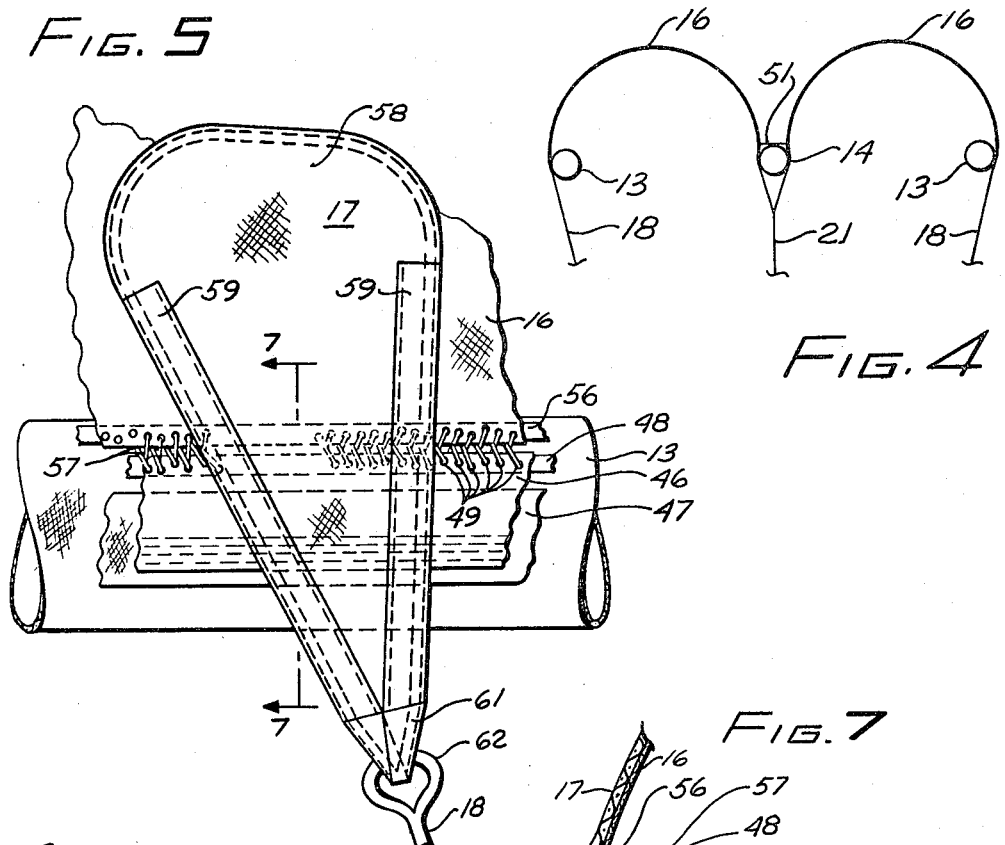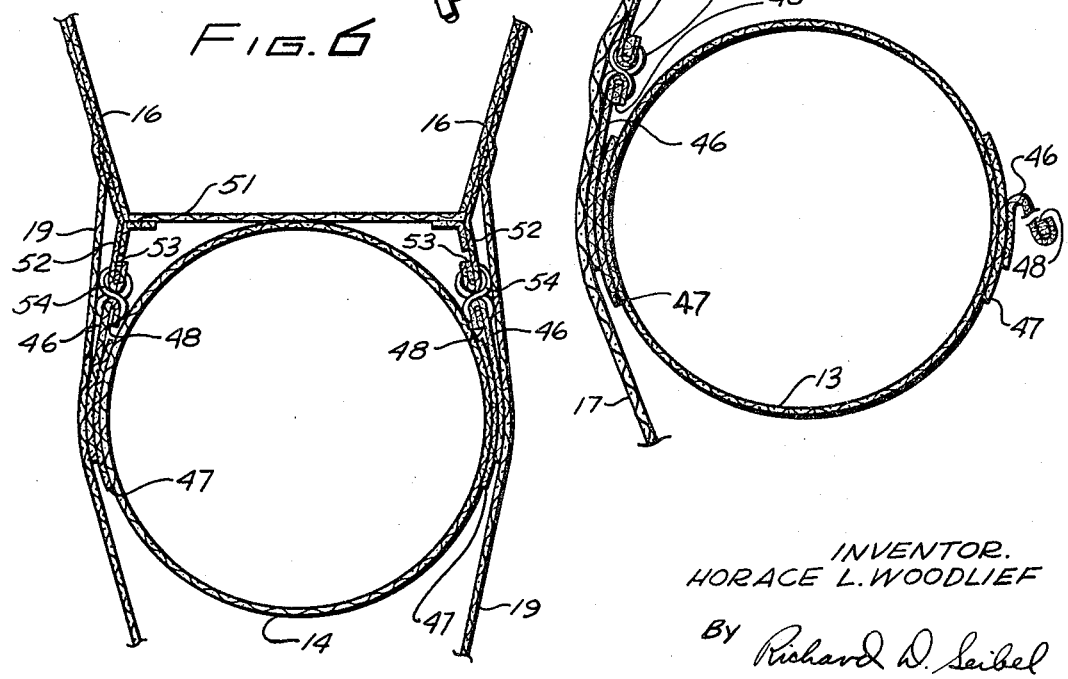

United States Patent Office 3,384,329
Patented May 21, 1968

3,384,329
FLEXIBLE WING VEHICLE
Horace L. Woodlief, Jr., Alhambra, Calif., assignor to North American Rockwell Corporation, a corporation of Delaware
Filed July 1, 1966, Ser. No. 562,137
13 Claims. (Cl. 244—45)

ABSTRACT OF THE DISCLOSURE

Construction features of a flexible wing gliding vehicle comprising three inflatable flexible booms forming a rigidifiable trifurcated frame and a fabric sail between the booms are described. The booms are substantially identical fabric tubes connected to the sail by compliant lacings. A payload is suspended below the wing by a plurality of riser lines which are each connected directly to the sail via triangular fabric gussets. The payload is thus suspended from the sail and application of localized bending loads on the booms is minimized.

---

In recent years considerable interest has been shown in flexible wing vehicles for providing gliding flight in the atmosphere. Such vehicles are employed for landing payloads from an aircraft, for example, at a selected site by controlling the glide path of the vehicle to the site. The lift of such a vehicle can be controlled for control of the flight range and the aerodynamic characteristics of the vehicle can be modified in flight to provide steering. In such a vehicle it is desirable to distribute stresses over large areas so that concentrated loads are avoided and the acceptable buckling strength of stiffening members can be lower. This permits the use of smaller, lighter structures which give better aerodynamics and in many instances increased reliability.

It is therefore a broad object of this invention to provide an improved aerodynamic vehicle.

Thus in the practice of this invention according to a prefererd embodiment there is provided an inflatable trifurcated frame having a flexible sail secured to the branches thereof to form an aerodynamic body. A payload is suspended from the aerodynamic body by a plurality of riser lines secured therebetween. The frame of the aerodynamic body is fabricated of three inflatable booms that in a prefered embodiment are substantially identical. The three booms are interconnected at an apex at the leading end of the vehicle. Lacing strips are provided along the length of each the booms for detachably securing them to the sail by laces. The riser lines between the aerodynamic body and the payload are secured directly to the sail by way of fabric gussets so that the loads are distributed on the sail and no concentrated loads are applied to the booms. The payload is thus suspended from the sail in the general manner of a parachute and the inflatable booms serve to stiffen the structure rather than serving as load bearing beams. The ends of the booms may have any of a variety of mechanical or pneumatic connections for the boom. The direct attachment of the sail to the risers, and the laced connection to the booms each help minimize the bending moments on the inflatable booms.

It is a broad object of this invention to minimize bending moments on rigid members of an aerodynamic vehicle.

Thus it is another object of this invention to provide an improved means for suspending a payload from an aerodynamic vehicle.

Figure 2:
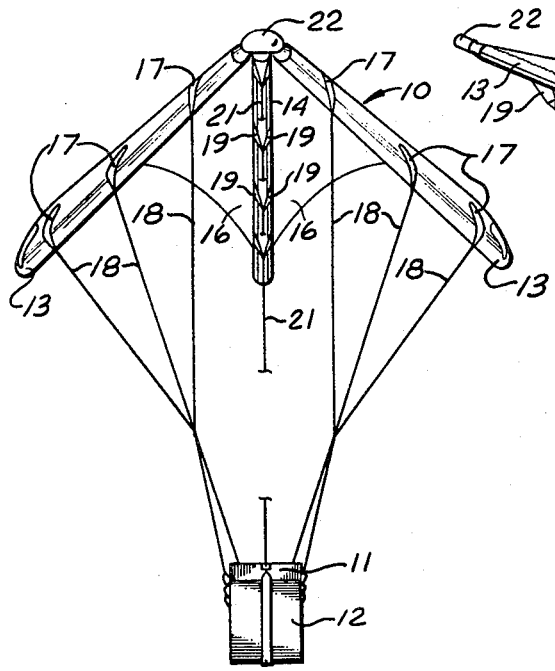
Figure 1:
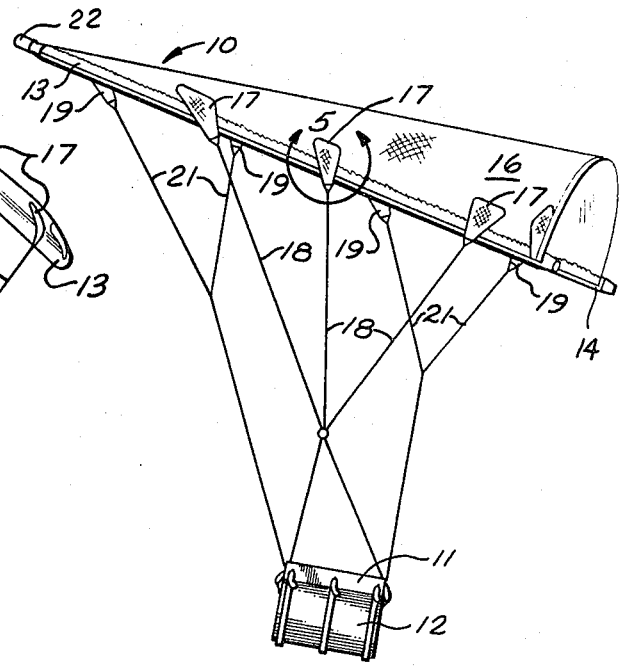
Figure 3:
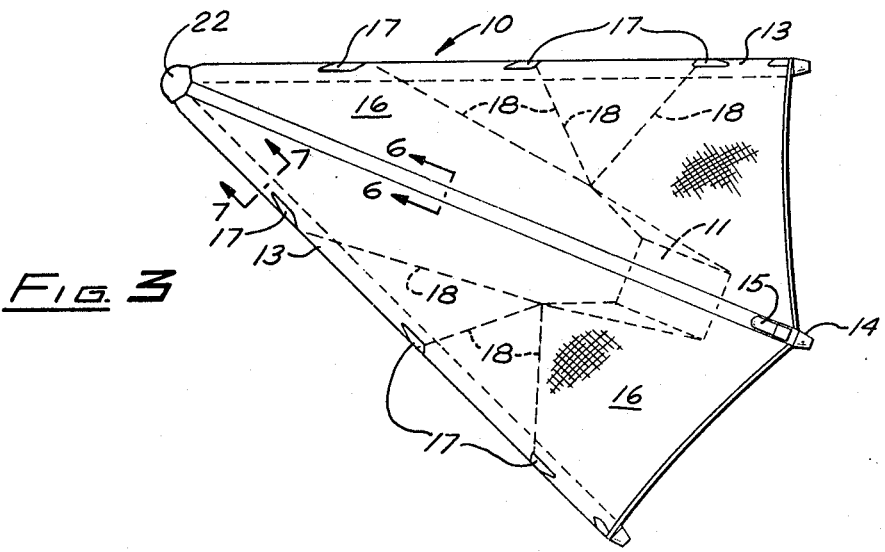

Other objects and many of the attendant advantages of this invention will be readily appreciated as the same becomes better understood by reference to the following detailed description when considered in connection with the acompanying drawings wherein:

FIG. 1 illustrates a side view of a vehicle constructed according to the principles of this invention;
FIG. 2 illustrates a front view of the vehicle of FIG. 1;
FIG. 3 illustrates a top view of the vehicle of FIG. 1;
FIG. 4 comprises a schematic cross-section of the vehicle of FIG. 1;
FIG. 5 illustrates a detailed view of a portion of one of the leading edge booms of the vehicle of FIG. 1;
FIG. 6 is a cross section of the keel boom of the vehicle of FIG. 1; and
FIG. 7 is a cross section of a leading edge boom of the vehicle of FIG. 1.

Throughout the drawings like numerals refer to like parts.

FIG. 1 illustrates an aerodynamic vehicle incorporating the principles of this invention. As illustrated in this embodiment there is provided an aerodynamic body or wing 10 from which is suspended a control platform 11 to which is secured a payload 12 by conventional means such as straps. The aerodynamic body 10 comprises a trifurcated frame having two leading edge booms 13 and a keel boom 14 therebetween in a substantially crowfoot shape with three branches. The two leading edge booms 13 and the keel boom 14 are attached together at the leading end of the aerodynamic body 10 at an apex 22 and diverge toward the trailing end.

The apex 22 can be a conventional inflatable member between the two booms, or can be an interconnection that is rigid after deployment such as in U.S. Patents Nos. 3,140,842 and 3,153,877. It is preferred in order to further reduce bending moments in the booms to employ an apex connection that permits articulation in two mutually angulated directions such as the articulated apex described and claimed in copending U.S. patent application Ser. No. 562,138 entitled, "Flexible Wing Vehicle Apex," by H. E. Rollins, assigned to North American Aviation, Inc., the assignee of this invention.

A fabric sail 16 is secured between each of the leading edge booms 13 and the keel boom 14 to provide a lifting surface. The booms 13 and 14 are formed of flexible inflatable tubes, and, during gliding flight, are inflated to a sufficient pressure to remain rigid under aerodynamic loads. A convenient location for a conventional pressurization system 15 is atop the aft end of the keel boom 14. Under aerodynamic loading the sail 16 forms high lobes between the rigidified booms and supports the vehicle in the atmosphere. By trimming the body 10 to have a positive angle of attack, a good lift over drag ratio is obtained for prolonged gliding flight and gentle landing of payloads.

A plurality of leading edge gussets or splice sheets 17 are secured directly to the sail 16 so as to pass over the leading edge booms 13 and a plurality of leading edge riser lines 18 are secured between the gussets 17 and the control platform 11. Keel gussets 19 are secured in pairs directly to the sail adjacent the central or keel boom 14 of the aerodynamic body with keel gussets located symmetrically on either side of the boom to maintain bilateral symmetry of loading. Keel riser lines 21 extend between the keel gussets 19 and the control platform 11. The riser lines 18 and 21 support the control platform 11 and payload 12 from the aerodynamic body 10.

In order to keep the pressurization required in the booms at a low value and to keep the booms a relatively small diameter so as not to interfere with smooth air flow of a gliding vehicle, it is desirable to keep the bending stresses on the booms at a relatively low value. When the bending stresses are at a high value the booms will buckle and the aerodynamic properties of the gliding vehicle would be destroyed. The bending moments along the length of the booms are minimized by securing the riser lines 18 and 21 directly to the sail 16 by means of the gussets 17 and 19 respectively. As described hereinafter, the booms are fastened to the sail by means of lacing which helps distribute loads and minimize bending moments. Since the principal aerodynamic loads are on the sail and these are transmitted directly to the control platform 11 by way of the riser lines, and the booms are "decoupled" from the sail by flexible lacing, there are no highly localized loads on the booms that may cause buckling. With such an arrangement the loads applied to the booms by the sail and riser lines are spread over appreciable lengths of the booms and it is found that a relatively small diameter boom with relatively low pressurization will remain rigid.

Air flow during gliding inflates the sail in a manner somewhat similar to inflation of the canopy of a parachute and tends to flatten the sail and cause a spread between the booms. Conversely the force of the riser lines supporting the payload tends to draw the edges of the sail and the booms together. During gliding flight these forces are balanced and an equilibrium flight geometry is obtained.

In the prior art, flexible wing vehicles have employed a rigidifiable frame comprising three members in the same general shape as the illustrate vehicle. These frames have had a fabric sail secured thereto to provide aerodynamic lift. The suspension or riser lines from the payload have been secured to the frame, on the underside thereof. The rigidifiable members have in this way served as load carrying beams, transmitting the sail load along their length to the points where the suspension lines to the payload are attached. An attempt has been made to minimize the bending moments on the rigidifiable members by having a large number of suspension line connection points, however, the bending forces remain high and heavy rigidifiable members are required. In flexible wing vehicles with inflatable members, large diameters and high pressure inflation have been necessary to maintain the required stiffness.

The aerodynamic loads developed in the sail produce internal stresses in the sail fabric and these loads are preferably transmitted directly to the riser lines with the inflatable booms serving to give shape to the vehicle and stiffen the leading edges of the sail. Thus in a preferred embodiment the sail is continuous from one leading edge where riser lines are attached, across the keel boom, and to the other leading edge. Riser lines are secured to the sail adjacent the keel boom to give a general double lobe shape to the sail during flight.

The general arrangement of sail, risers, and booms is illustrated in FIG. 4 which comprises a schematic transverse cross-section of the flexible wing vehicle of FIG. 1 in gliding flight. The sail 16 is inflated by aerodynamic forces into two lobes with leading edge riser lines 18 holding the lateral edges downwardly and inwardly. The center portion of the sail is held downward by a keel riser line 21 so that two lobes are formed instead of one. The sail is continuous over the keel boom 14 in the form of a web 51 further illustrated hereinafter. Leading edge booms 13 lie along the edges of the vehicle and provide stiffness to the leading edge of the sail between the riser lines. The keel boom provides substantial straightness along the length of the vehicle. The length of the riser lines (FIG. 1) is such that the flexible wing is substantially straight along its length and the booms provide stiffness to assure straightness between the risers and at the boom ends beyond the risers. Thus, since the booms provide stiffness to portions of the sail rather than carrying loads from the sail to riser lines, the bending forces on the booms are minimized and small diameter, low pressure inflatable booms can be employed.

In a preferred embodiment the leading edge booms 13 and the keel boom 14 are substantially identical and for purposes of exposition a single boom will be described in detail. However, it will be understood that such a boom can be used for either a leading edge boom or a keel boom. The booms are preferably constructed from a conventional rubberized fabric so that leakage through the flexible tube is minimized.

As is illustrated in FIGS. 5–7, a lacing portion is provided along the length of the typical boom on each side thereof. Each lacing portion comprises a nylon fabric lacing strip 46 that is stitched to a fabric bonding strip 47 with several rows of stitches. As illustrated in FIG. 5 the general location of stitching on the strips, gusset and sail is by means of dashed lines. It should be understood that additional stitching may be employed as desired. The bonding strip 47 is in turn cemented along the length of the boom over an area larger than the area where the lacing strip is stitched to the bonding strip. An adhesive bond to the boom is preferred over stitching to minimize the potential of leakage at points where the thread would perforate the wall of the booms. A larger contact surface on the boom for adhesive bonding is available by using a bonding strip than could be obtained with a lacing strip alone. In addition, the lacing strip 46 is secured to the bonding strip 47 by stitching along the length of the boom so that the point of possible application of peel loading tending to peel the strip from the boom has a stitched connection rather than an adhesive connection. The stitching is better able to resist any peeling tendencies that might destroy the adhesive bond.

The lacing strip 46 has an edge doubled and stitched around a fabric reinforcing tape 48 and a series of lacing eyelets 49 are provided through the extra thickness of lacing strip 46 and the fabric tape 48. The eyelets 49 are preferably in a staggered pattern to avoid the risk of ripping along a line of perforations. Identical lacing portions are provided on opposite sides of the boom so that the booms are substantially interchangeable and are symmetrical end to end so that they can be reversed if desired or can be used for either keel or leading edge booms.

The sail 16 that is secured to the frame formed by the leading edge booms 13 and the keel boom 14 is in the form of two abutting substantially triangular panels that are secured together along one edge of each panel by a web 51 that lies along the abutment as illustrated in FIGS. 3, 4, and 6. When the sail is assembled on the trifurcated frame the web 51 lies along the keel boom 14. In the embodiment illustrated in FIG. 6 a lacing strip 52 is stitched to the sail adjacent the web 51 for attachment to a lacing strip 46 on the keel boom. Each of the lacing strips 52 has an edge doubled and stitched over a fabric reinforcing tape 53. A plurality of staggered lacing eyelets (not shown in FIG. 6) are provided along the edge through the doubled lacing strip fabric and the reinforcing tape. In the embodiment illustrated in FIG. 6, the web is integral with the sail panels and the lacing strips are stitched to the sail. It will be apparent that the lacing strips could be integral with the sail and the web stitched on, or other arrangement provided.

The sail 16 is secured to the keel boom 14 by braided nylon lacing 54 passing between the lacing strip 46 on the keel boom and the lacing strip 52 on the sail. Two such lacings 54 are provided, one on each side of the keel boom and the web 51 so that the loadings are symmetrical.

The aerodynamic load on the sail appears as a tensile load in the sail fabric and a small portion of this tensile load is transmitted by way of the lacing 54 to the lacing strip 46 on the boom and is in turn transmitted through the bond strip 47 to the keel boom. Another portion of the tensile load is transmitted to the web 51 between the two sail panels. The principal load is transmitted to the keel gussets 19 and hence to the keel riser lines 21.

Along the leading edge of the sail there is a lacing portion having the sail fabric doubled and stitched over a fabric reinforcing strip 56 as illustrated in FIGS. 5 and 7. The lacing portion on the leading edge of the sail is attached to one of the lacing strips 46 on the leading edge boom 13 by braided nylon lacing 57. It is preferred to have the sail pass over the leading edge boom and be secured to the far side thereof from the keel boom. Since the leading edge booms 13 have but a single portion of sail secured thereto, one of the lacing strips 46 of a typical boom is unused as can be seen in FIG. 7. A small amount of the tensile aerodynamic load on the sail is transmitted to the leading edge boom by way of the lacing 57, however, the principal load is transmitted to the leading edge riser lines by way of the leading edge gussets.

It is found in an aerodynamic vehicle of the type described that the regidifiable booms are preferably laced to the sail in the manner illustrated so that manufacturing variations in the sail and booms can be readily accommodated and the booms are fully interchangeable. It is also found that such a compliant connection as the illustrated lacing distributes loads so that no highly localized loads are applied to the booms. This minimizes the bending moments on the booms so that the diameter of the booms and the pressurization required in order to maintain a required stiffness are minimized.

As has been mentioned hereinabove, a plurality of leading edge gussets 17 are secured adjacent each leading edge of the sail 16 for supporting the payload from the leading edge of the aerodynamic body. Similarly a plurality of keel gussets 19 are secured directly to the sail adjacent the web 51 that lies over the keel boom 14. There are keel gusseets 19 on either side of the keel boom and each keel gusset on one side and a corresponding keel gusset on the other side are both attached to a single keel riser line 21 for supporting the payload.

Each of the leading edge gussets 17 and keel gussets 19 is substantially identical with the difference lying only in the angle of application of loads and the corresponding angular relation of the sides of the gusset. Thus a single leading edge gusset will be described herein for purposes of illustration and it will be understood that the other leading edge and keel gussets are substantially similar in construction and arrangement.

Thus there is illustrated in FIGS. 5 and 7 a leading edge gusset comprising a fabric sheet 58 having a substantially triangular shape. The gusset, which might also be known as a splice sheet, is stitched to the sail around the portion of the periphery of the gusset in contact with the sail. A fabric load bearing tape 59 is stitched along two edges of the gusset sheet 58 and extends from one point of the substantially triangular sheet in the form of an open loop 61. The extending point of the gusset is beyond the edge of the sail panel and is employed for securing a riser line 18 which preferably has a loop 62 interlocked with the open loop 61 on the gusset.

The load applied by the way of the riser line 18 is thus applied to the tape 59 which distributes the load on the gusset sheet 58. The gusset sheet 58 is stitched directly to the sail and not to the inflatable boom. This tends to minimize the localized loads on the booms and minimizes bending moments. As a consequence the diameter of the booms can be kept small which is aerodynamically desirable and the pressurization can be kept low which is desirable from a weight and reliability point of view.

Other aspects of a flexible wing vehicle are described and claimed in copending U.S. patent application Ser. No. 562,139, entitled, "Flexible Wing Vehicle," by A. F. Cummings, A. B. Miller, W. T. Neal, and H. E. Rollins, assigned to North American Aviation, Inc., the assignee of this invention.

Obviously many modifications and variations of the present invention are possible in light of the above teachings. It is therefore to be understood that within the scope of the appended claims the invention may be practiced otherwise than as specifically described.

What is claimed is:
1. A flexible wing vehicle comprising:
a flexible sail comprising two abutting similar triangles having an abutting keel portion extending longitudinally of the vehicle and a pair of leading outer edge portions;
means for interconnecting the similar triangles;
a payload supporting member beneath said sail;
a plurality of riser lines secured to said payload supporting member and secured directly to both leading edge portions and to the keel portion of said sail on edges of the similar triangles adjacent said interconnecting means at longitudinally spaced points thereof; and
a plurality of sail stiffening members secured to said leading edge and keel portions respectively, whereby loads are supported directly by the sail and distributed by the sail to the stiffening members, and application of concentrated loads to the stiffening members is avoided.

2. An aerodynamic body as defined in claim 1 wherein said sail stiffening members are each connected to said sail by a compliant interconnection.

3. An aerodynamic body as defined in claim 2 wherein said complaint interconnection comprises a flexible lacing between said sail and said sail stiffening member along the length thereof.

4. An aerodynamic body as defined in claim 2 wherein said sail stiffening members each comprise a substantially similar inflatable fabric tube.

5. An aerodynamic body as defined in claim 1 further comprising:
a plurality of fabric gussets secured to said sail adjacent the leading edge portions thereof, each of said gussets having a substantially triangular shape and having a point extending beyond a leading edge of said sail; and wherein
one of said riser lines is connected to the extending point of each of said gussets.

6. An aerodynamic body as defined in claim 5 further comprising:
a plurality of first fabric gussets secured to said sail on one side of the keel stiffening member;
a plurality of second fabric gussets secured to said sail on the other side of the keel stiffening member, each of said first and second gussets forming a pair each having a substantially triangular shape and having a point extending from said sail; and wherein
one of said riser lines is connected to the extending points of both of said gussets of each pair.

7. An aerodynamic body comprising:
a trifurcated frame including a pair of leading edge booms and a keel boom therebetween, said booms being interconnected at one end thereof;
a first substantially triangular fabric sail panel attached along one edge thereof to one of said leading edge booms by a compliant interconnection and along another edge thereof to said keel boom by a compliant interconnection;
a second substantially triangular fabric sail panel attached along one edge thereof to one of said leading edge booms by a compliant interconnection and along another edge thereof to said keel boom by a compliant interconnection;
a continuous interconnection between said first sail panel and said second sail panel along the top said keel boom;
a plurality of flexible means secured directly to said sail panels adjacent both edges of each panel for transmitting a load directly to said sail panels;
a plurality of riser lines, each of said riser lines having an end attached to said flexible means; and
a payload supporting member attached to the other ends of said riser lines.

8. An aerodynamic body as defined in claim 7 wherein each of said flexible means comprises a substantially triangular fabric gusset secured to said sail around a portion of the periphery of said gusset and having a point extending beyond the edge of said sail panel.

9. An aerodynamic body as defined in claim 8 wherein said gussets comprise:
- a plurality of keel gussets secured directly to said sail panels adjacent the edges thereof adjacent said keel boom; and wherein
- a keel gusset on said first sail panel and a corresponding keel gusset on said second sail panel are both attached to a single keel riser line.

10. An aerodynamic body as defined in claim 9 wherein each of said keel gussets comprises:
- a substantially triangular fabric sheet; and
- a tape secured along two edges of said sheet and extending beyond said sheet to form a loop at the extending point of said gusset.

11. An aerodynamic body as defined in claim 8 wherein each of said gussets comprises a substantially triangular fabric sheet and a tape secured along two edges of said sheet and extending beyond said sheet to form a loop at the extending point of said gusset; and wherein
- a plurality of said gussets are secured to said sail panels along the leading edges of the aerodynamic body and a plurality of said gussets are secured to said sail panels adjacent the edges thereof adjacent said keel boom and wherein a keel gusset on said first sail panel and a corresponding keel gusset on said second sail panel are both attached to a single keel riser line.

12. An aerodynamic body as defined in claim 8 wherein said booms each comprise a substantially similar inflatable fabric tube and wherein said compliant interconnections comprise:
- a fabric bonding strip cemented to each side of said keel boom along the length thereof;
- a fabric lacing strip stitched to each of said bonding strips along the length thereof, said lacing strip having a reinforced edge with a plurality of lacing eyelets in a staggered pattern;
- flexible lacing interconnecting said sail and the lacing eyelets on said keel boom for detachably securing said sail to said keel boom along the length thereof;
- a reinforced lacing portion along the leading edge of each of said sail panels, said lacing portion having a plurality of lacing eyelets along a staggered pattern;
- a fabric bonding strip cemented along the length of each of said leading edge booms on the side furthest from said keel boom;
- a fabric lacing strip stitched along the length of said bonding strip on each of said leading edge booms, said lacing strip having a reinforced edge with a plurality of lacing eyelets in a staggered pattern; and
- flexible lacing interconnecting the lacing eyelets on said sail and the lacing eyelets on said leading edge booms for detachably securing said sail to said leading edge booms along the length thereof.

13. An aerodynamic body as defined in claim 12 further comprising:
- a reinforced lacing portion along the edge of each of said sail panels adjacent said keel boom, said lacing portion having a plurality of lacing eyelets in a staggered pattern for interconnection with said flexible lacing on said keel boom; and wherein
- said continuous interconnection between said sail panels comprises a fabric web between said sail panels and overlying said keel boom; and wherein
- each of said gussets comprises a substantially triangular fabric sheet, and a tape secured along two edges of said sheet and extending beyond said sheet to form a loop at the extending point of said gusset.

References Cited

UNITED STATES PATENTS

| | | | |
|---|---|---|---|
| 3,141,640 | 7/1964 | Sutliff et al. | 244—138 |
| 3,198,458 | 8/1965 | Fink | 244—49 |
| 3,212,730 | 10/1965 | Tschudy et al. | 244—1 |
| 3,275,271 | 9/1966 | Forehand | 244—138 |
| 3,310,261 | 3/1967 | Rogallo et al. | 244—44 |
| 3,269,674 | 8/1966 | Girard. | |

OTHER REFERENCES

Aviation Week & Space Technology, Jan. 27, 1964, cover page and p. 89.

FERGUS S. MIDDLETON, *Primary Examiner.*

B. BELKIN, *Assistant Examiner.*